United States Patent
Murray

(10) Patent No.: US 9,487,644 B2
(45) Date of Patent: Nov. 8, 2016

(54) POLYMER PREPARATION

(75) Inventor: Graham Simpson Murray, Hampshire (GB)

(73) Assignee: BAC2 LIMITED, Southampton (GB)

(*) Notice: Subject to any disclaimer, the term of this patent is extended or adjusted under 35 U.S.C. 154(b) by 486 days.

(21) Appl. No.: 13/201,738

(22) PCT Filed: Feb. 22, 2010

(86) PCT No.: PCT/GB2010/050298
§ 371 (c)(1),
(2), (4) Date: Oct. 27, 2011

(87) PCT Pub. No.: WO2010/094979
PCT Pub. Date: Aug. 26, 2010

(65) Prior Publication Data
US 2012/0041168 A1    Feb. 16, 2012

(30) Foreign Application Priority Data

Feb. 20, 2009 (GB) .................................. 0902863.0
Jul. 15, 2009 (GB) .................................. 0912267.2

(51) Int. Cl.
*C08G 8/10* (2006.01)
*C08K 5/32* (2006.01)
*C08L 61/06* (2006.01)
*C08L 61/20* (2006.01)
*C08L 61/24* (2006.01)
*C08L 61/28* (2006.01)

(52) U.S. Cl.
CPC ................. *C08K 5/32* (2013.01); *C08L 61/06* (2013.01); *C08L 61/20* (2013.01); *C08L 61/24* (2013.01); *C08L 61/28* (2013.01)

(58) Field of Classification Search
CPC .......... C08K 5/32; C08L 61/20; C08L 61/28
USPC ........................................................ 524/429
See application file for complete search history.

(56) References Cited

U.S. PATENT DOCUMENTS

| 4,960,826 A | 10/1990 | Walisser |
| 5,344,909 A | 9/1994 | Hutchings et al. |
| 2004/0198926 A1* | 10/2004 | Swedo et al. .................. 525/534 |

FOREIGN PATENT DOCUMENTS

| EP | 1616928 A1 | 1/2006 |
| FR | 2373577 A1 | 7/1978 |
| WO | 2004029119 A1 | 4/2004 |
| WO | WO 2004/029119 * | 4/2004 |
| WO | 2006136614 A1 | 12/2006 |
| WO | 2008001089 A1 | 1/2008 |

OTHER PUBLICATIONS

PCT Written Opinion, PCT Patent Application No. PCT/GB2010/050298, Jun. 22, 2010.
PCT International Search Report, Jun. 22, 2010.

* cited by examiner

*Primary Examiner* — Doris Lee
(74) *Attorney, Agent, or Firm* — Westman, Champlin & Koehler, P.A.; Z. Peter Sawicki; Amanda Prose

(57) ABSTRACT

The invention provides a retarded acid-curing pre-polymeric composition wherein the composition comprises an acid, a pre-polymer and hydroxylamine; use of hydroxylamine as a retarder for an acid-curing pre-polymer composition; a method of retarding the curing of an acid-curing pre-polymeric composition which method comprises the step of adding hydroxylamine to the pre-polymer to form a pre-polymer mixture; and a method of curing a retarded acid-curing pre-polymeric composition wherein the method comprises the step of heating the composition to an elevated temperature for use in improving processing and controlling reactivity in a wide range of industrial applications.

4 Claims, No Drawings

POLYMER PREPARATION

CROSS-REFERENCE TO RELATED APPLICATION

This Application is a Section 371 National Stage Application of International Application No. PCT/GB2010/050298, filed Feb. 22, 2010, the content of which is hereby incorporated by reference in its entirety.

FIELD

The present invention relates to the use of hydroxylamine as a retarder for a curing reaction for an acid-cured polymeric resin and to a pre-cured acid-curing polymeric resin comprising hydroxylamine.

BACKGROUND

Thermoset polymers made from acid cured pre-polymer resins including phenol-formaldehyde resoles (PF), furane or furfuryl alcohol resins (FA), melamine-formaldehyde resins (MF), urea-formaldehyde resins (UF), and PF/FA, PF/UF, PF/MF, PF/UF/MF blends of such pre-polymer resins are used in the production of bulk moulding compounds, sheet moulding compounds, abrasives, grinding wheels, disks, friction materials, foam insulation, mineral insulation and glass fibre insulation, adhesives, inks, coatings, pre-pregs, electronics, laminates, filament winding, pultrusion, glass fibre composites, resin transfer moulding, vacuum bagging, carbon composites, bipolar plates, carbon electrodes, conductive composite electrodes, polymer electrolytes and membranes.

The ability to control the reactivity of a pre-polymer-catalyst system is important in terms of safety and processing economics. Thermosetting resins can be highly reactive when mixed with strong acids and dangerous exothermic reactions can result. The reactivity of a catalysed resin can be so rapid that the processing becomes impossible or very expensive. An example is where fabric is impregnated by soaking in a tank of resin and catalyst mixture before being further processed to form a composite sheet, wound pipe or extruded part. The resin and catalyst mixture should be a stable liquid long enough for the fabric to pass through the impregnation tank and then be reactive when heated to an elevated temperature without excessive reaction times.

In WO 2008/001089, a novel acid-cured conductive polymer is described. The acidic phenolic resin compositions disclosed in this document have been found to be highly reactive. In order to be able to have more control over the properties of mouldings formed from such compositions, a way to control the reactivity of the mix formulations has been sought.

U.S. Pat. No. 5,344,909 describes a latent catalysed phenolic resin composition containing a thermosetting phenolic resole resin and a latent catalyst consisting essentially of a primary or secondary amine salt of a strong acid for use in filament winding applications. Amines for preparing the latent catalyst are described as having a formula R—$NH_2$ or R—NH—R. Normally, the R substituent will be selected from hydrocarbon moieties such as alkyl groups, generally a lower alkyl of 1 to 8 carbon atoms. However, alternative latent catalysts or retarders are needed.

For most applications where pre-mix production is not close to the moulding operation, it is desirable to have greater control over the reaction rate to enable large scale production, shipping, storage and reproducible moulding. Latent catalysts or retarders which can enable this are sought.

A way of ameliorating these problems has been sought.

SUMMARY

According to the invention there is provided use of hydroxylamine as a retarder for an acid-curing pre-polymer.

According to the invention there is also provided a retarded acid-curing pre-polymeric composition wherein the composition comprises an acid, a pre-polymer and hydroxylamine.

According to the invention there is further provided a method of retarding the curing of an acid-curing pre-polymeric composition which method comprises the step of
(i) providing a pre-polymer;
(ii) adding hydroxylamine to the pre-polymer to form a retarded pre-polymer formulation;
(iii) adding an acid to the retarded pre-polymer formulation.

According to the invention there is also provided a method of retarding the curing of an acid-curing pre-polymeric composition which method comprises the step of
(i) providing an acid;
(ii) adding hydroxylamine and optionally a stabilising solvent to the acid to form a retarded acid formulation;
(iii) adding a pre-polymer to the retarded acid formulation.

According to the invention there is further provided a method of curing a retarded acid-curing pre-polymeric composition wherein the method comprises the steps of: providing a retarded acid-curing pre-polymeric composition comprising an acid, a pre-polymer and hydroxylamine; heating the composition to an elevated temperature.

According to the invention there is further provided a retarded pre-polymer formulation for use in the preparation of a composition according to the invention wherein the formulation comprises a pre-polymer and hydroxylamine.

According to the invention there is further provided a retarded acid formulation for use in the preparation of a composition according to the invention wherein the formulation comprises an acid, hydroxylamine and optionally a stabilising solvent.

DETAILED DESCRIPTION OF THE ILLUSTRATIVE EMBODIMENTS

It has surprisingly been found that hydroxylamine retards the curing of an acid-curing pre-polymeric composition. A retarded composition according to the invention has an advantage that it is straight forward to cure the pre-polymeric composition as it is only necessary to heat it to an elevated temperature. Accordingly, the composition according to the invention is suitable for use with the aforementioned applications and in particular carbon composite bipolar plate moulding.

Hydroxylamine is a compound used in chemical processes in the electronics industry and pharmaceuticals. It is supplied commercially as a 50% by weight aqueous solution. In its crystalline form, hydroxylamine is highly unstable and can decompose violently at ambient temperature in the presence of metallic impurities.

In some embodiments, the hydroxylamine is present in an amount sufficient for the composition to be storage stable. The molar ratio of hydroxylamine to acid may be chosen to optimise storage stability whilst still allowing the composition to be curable. A skilled person would easily be able to determine a suitable molar ratio by trial and error. In some embodiments, the molar ratio of hydroxylamine to acid in the acid-curing composition is at least 1:1, for example 1.3:1, 1.4:1, 1.44:1, 1.7:1, 1.9:1, 2.5:1, 3:1 or 5:1.

An advantage of including hydroxylamine in a molar ratio of hydroxylamine to acid of at least 1:1 is that the curing of the composition may be delayed for a substantial period of time. In tests, it has been found that hydroxylamine in this molar proportion can be used to retard curing for at least 160 days. This is substantially longer than the delay in curing obtained with known retarders. In U.S. Pat. No. 5,344,909, the use of primary and secondary amines is said to have extended the pot life of a phenolic resole resin in the best case from 80 minutes to 600 minutes.

For some applications (e.g. carbon composite bipolar plate mouldings), it is necessary to have greater control over the reaction rate such that the pot life can be measured in months to enable large scale production, shipping, storage and reproducible moulding. A storage life measured in minutes would necessitate pre-mix production very close to the moulding operation. Accordingly, the composition according to the invention including hydroxylamine in a molar ratio of hydroxylamine to acid of at least 1:1 is suitable for use in an application where the composition is prepared at a different location to where it is used.

In some embodiments, the elevated temperature used in the method of curing according to the present invention is a temperature above the decomposition temperature of hydroxylamine (which is about 117° C.), for example a temperature at or above 120° C. Above the decomposition temperature of hydroxylamine the rapid release of acid results in a fast cure of a pre-polymer. At lower temperatures for example above 50° C., a slow release of acid can result and cure rates of pre-polymers will be slow.

In some embodiments, it has been found that to ensure ideal curing conditions, the temperature used to cure a composition is dependent on the weight of the composition to be cured. In some embodiments, the temperature used to cure the composition may be increased as the weight of the composition is increased. The degree of increase may depend upon several factors. For example, as part of the curing process, it is necessary for the hydroxylamine to decompose and escape from the composition; thus the increase in temperature needs to be balanced against the surface area of the composition. With a larger composition with a lesser surface area, the decomposition of hydroxylamine and escape is delayed as the time to heat up the mould material is longer. Failing to ensure adequate cure results in blistering of the composite part or plate surface which can be a factor where a smooth surface or aesthetic appearance is important. A higher temperature appears to accelerate both the decomposition and the escape of the decomposition gases as well as accelerating the cure reaction. In the light of these considerations, a skilled person should easily be able to determine a suitable cure temperature. As a general guide, for example in the manufacture of carbon composite bipolar plate suitable cure temperatures are indicated in Table 1 for various plate weights:

TABLE 1

| Plate Weight | Cure Temperature |
|---|---|
| 10 g | 120° C. |
| 20 g | 130° C. |
| 120 g | 145° C. |
| 350 g | 150° C. |

In some embodiments, the pre-polymer may be a solvented resole. A solvented resole suitable for use in the present application is described in international patent publication WO 2008/001089. In some embodiments, a solvented resole may comprise (i) a phenolic resole and (ii) a solvent. The solvented resole may be substantially free from water.

The term substantially free from water in the present specification is intended to cover a water content which is sufficiently low for the phenolic resole to be cured by a sufficient amount of acid for the resin to have conductive properties without a violent exotherm when the acid and phenolic resole are mixed. This water content may easily be determined by a person of skill in the art depending on the starting materials used. The water content may be less than 5% by weight, optionally less than 4% by weight, for example less than 3% by weight, optionally less than 2% by weight, for example less than 1% by weight.

The solvent (ii) may be a solvent as defined in paragraphs [010], [011] and [012] of WO 2008/001089, the contents of which paragraphs are incorporated herein by reference.

In some embodiments, the phenolic resole (i) may be a reaction product of a phenol-reactive aldehyde with a compound of formula (II) as defined in paragraphs [016] and [017] of WO 2008/001089, the contents of which paragraphs are incorporated herein by reference. The phenol-reactive aldehyde may be a compound of formula (III) as defined in paragraphs [019] to [021] of WO 2008/001089, the contents of which paragraphs are incorporated herein by reference. The phenolic resole may be a compound as defined in paragraph [018] of WO 2008/001089, the contents of which paragraph are incorporated herein by reference.

In some embodiments, the pre-polymer may be any resin that when acidified will undergo a polymerisation reaction. Such resins include:
a) phenol-formaldehyde resoles (PF);
b) furane or furfuryl alcohol resins (FA);
c) melamine-formaldehyde resins (MF); and/or
d) urea-formaldehyde resins (UF).

The PF resole resins (a) are generally the reaction products of a phenol and an aldehyde. In some embodiments, from about 1.1 to 3 mols of an aldehyde per mol of the phenol (optionally from 1.5 to 2.5 mols of the aldehyde per mol of the phenol) are employed in producing a suitable PF resole resin. The reaction of the phenol and the aldehyde may be conducted in the presence of a basic catalyst such as ammonia, sodium hydroxide, potassium hydroxide or barium hydroxide. In some embodiments, an amount of from 0.1 to 0.001 mol of catalyst (or optionally from 0.05 to 0.002 mols of catalyst) is used per mol of the phenol. The PF resole resin is generally a liquid.

The furane or furfuryl alcohol resins (b) are generally thermosetting resins made by reacting furfuryl alcohol with formaldehyde or by the self-polymerization of furfuryl alcohol, or a combination of reacting furfuryl alcohol with formaldehyde followed by polymerisation.

In some embodiments, the mole ratio of furfuryl alcohol to formaldehyde may vary from about 3:1 to about 0.5:1, respectively, optionally about 2:1 to about 1:1. A water soluble metal salt may be used as the catalyst and may vary from about 0.2 to about 8% by weight of the furfuryl alcohol. The reaction may be carried out at a temperature of about 85 to 105° C. at atmospheric pressure or at an elevated temperature under pressure.

A melamine-formaldehyde resin (c) may be prepared as follows. In some embodiments, a mixture of a resole and a melamine may be heated to effect a melamine formaldehyde reaction to produce a dissolved methylol melamine reaction product (as disclosed in U.S. Pat. No. 4,960,826, the contents of which are incorporated herein by reference). The term melamine resin is a general term to encompass any melamine-formaldehyde resin with or without other ingredients, e.g., urea groups.

A urea-formaldehyde resin (d) may be prepared as follows. A thermosetting urea-formaldehyde (UF) resin may be prepared from urea and formaldehyde monomers or from a UF pre-condensate in a manner well known to a person of skill in the art. Such a person would recognize that the urea and formaldehyde reactants are commercially available in many forms. Any form which can react with the other reactants and which does not introduce extraneous moieties deleterious to the desired reaction and reaction product can be used in the preparation of a urea-formaldehyde resin useful in the invention. Formaldehyde for making a suitable UF resin is available in many forms, for example paraformaldehyde and/or a formalin solution are commonly used forms. Any form of urea or urea in combination with formaldehyde is suitable for use in the practice of the invention. Solid urea, such as prill, and/or a urea solution, for example as an aqueous solutions, are commonly available.

Any of the wide variety of known procedures used for reacting the principal urea and formaldehyde components may be used to form a UF thermosetting resin composition. Suitable examples include staged monomer addition, staged catalyst addition, pH control, and/or amine modification. In some embodiments, the urea and formaldehyde may be reacted at a mole ratio of formaldehyde to urea of from about 1.1:1 to about 4:1, optionally at a formaldehyde to urea mole ratio of from about 2.1:1 to about 3.2:1. Generally, the UF resin is highly water dilutable, optionally it is water soluble.

Many suitable thermosetting urea-formaldehyde resins are commercially available, such as those sold by Georgia Pacific Resins, Inc. (such as GP-2928 and GP-2980) for glass fiber mat, Hexion and Dynea. These resins are prepared as described above and contain reactive methylol groups that upon curing form methylene or ether linkages. Such methylol-containing adducts may include N,N'-dimethylol, dihydroxymethylolethylene; N,N'-bis(methoxymethyl), N,N'-dimethylolpropylene; 5,5-dimethyl-N,N'-dimethylolethylene; and/or N,N'-dimethylolethylene.

A polymer produced from an acid catalysed resin for use as a pre-polymer includes melamine-formaldehyde, urea-formaldehyde, phenol-formaldehyde, furan polymer and/or a polymer product from a blend of acid catalysed resins e.g. PF/FA, PF/UF, FA/UF, FA/MF, UF/MF, PF/MF, and/or PF/UF/MF.

The function of the acid used in the invention is to catalyse curing of the resin. In some embodiments, it may also promote conductivity of the polymer. The mechanism by which the acid promotes the conductivity of the polymer is not understood. In order to act as a conductivity promoter, the acid may be added in a large quantity compared to the amount of the acid required for it to act as a catalyst. The acid may be selected from an inorganic acid, an organic acid and/or an organo-mineral acid.

In some embodiments, a suitable organo-mineral acid for use as the acid may be a compound of formula $$R^5 X \quad (IV)$$

wherein $R^5$ represents
a hydrogen atom;
a straight or branched chain alkyl group containing from 1 to 8 carbon atoms (preferably from 1 to 4, more preferably from 1 to 2 carbon atoms) optionally substituted by a halogen atom; or
a phenyl group optionally substituted by a straight or branched chain optionally unsaturated alkyl group containing from 1 to 8 carbon atoms (preferably from 1 to 4 carbon atoms, more preferably from 1 to 2 carbon atoms) optionally substituted by a hydroxy group, a halogen atom (preferably chlorine), a hydroxy group, and/or a phenyl or benzyl group (optionally substituted by a hydroxy group and/or a straight or branched chain alkyl group containing from 1 to 8 carbon atoms (preferably from 1 to 4 carbon atoms, more preferably from 1 to 2 carbon atoms)); and
X represents a sulphonic acid group (—SO$_3$H), a phosphoric acid group (—OP(OH)$_3$), a phosphorous acid group (—P(O)(OH)$_2$), sulphuric acid (—SO$_4$H), nitric acid (—NO$_3$), hydrochloric acid (—CL), hydrofluoric (—F) or hydrobromic (—Br), or a sulphamic acid group (—H$_2$NSO$_3$).

In some embodiments, the acid may be an organo-mineral acid. $R^5$ in the compound of formula (IV) may represent a phenyl group optionally substituted by a straight or branched chain optionally unsaturated alkyl group containing from 1 to 8 carbon atoms (optionally from 1 to 4 carbon atoms, for example from 1 to 2 carbon atoms) optionally substituted by a hydroxy group, a halogen atom (optionally chlorine), a hydroxy group, and/or a phenyl or benzyl group (optionally substituted by a hydroxy group and/or a straight or branched chain alkyl group containing from 1 to 8 carbon atoms (optionally from 1 to 4 carbon atoms, for example from 1 to 2 carbon atoms)). Examples of suitable organo-mineral acids include methane sulphonic acid, phenol sulphonic acid, toluene sulphonic acid or xylene sulphonic acid. In some embodiments, the organo-mineral acid may be para-toluene sulphonic acid.

In some embodiments, particularly where the pre-polymer is a solvented resole, the amount of acid used may be sufficient for the polymer to be conductive. Generally a suitable amount is greater than 10% by weight of the solvented resole. Optionally the amount of acid is greater than 15% by weight of the solvented resole, for example greater than 20% by weight of the solvented resole. In some embodiments, up to 200% by weight of the solvented resole may be used, optionally up to 150% by weight of the solvented resole may be used, for example up to 100% by weight of the solvented resole may be used.

The pre-polymer used in the invention optionally includes a plasticiser to increase flexibility of the polymer. The plasticiser is preferably inert, acid compatible, non-volatile, and/or liquid. Preferably the plasticiser is soluble in the composition and/or the polymer. A suitable amount of plasticiser is determined by the application requirements. A person of skill in the art would be able to determine a suitable amount by trial and error. Examples of the plasticiser include an excess of the ester solvent, a polyvinylacetate and/or a polyethylene glycol.

In some embodiments, the retarded acid formulation comprises a stabilising solvent to prevent crystallisation of the acid/hydroxylamine mixture. A skilled person would be able to determine a suitable stabilising solvent and a suitable amount of such a solvent to use to prevent such crystallisation. Examples of suitable stabilising solvents include water, alcohols, glycols (for example ethylene glycol) and ketones. It has been found that acids such as methane sulphonic acid and nitric acid do not generally require a stabilising solvent when used in a retarded acid formulation. However, acids such as phosphoric acid, phenol sulphonic acid and p-toluene sulphonic acid may require a stabilising solvent.

In some embodiments, the hydroxylamine and acid or retarded acid formulation may be in the form of a latent acid, for example a latent acid which is in the form of a solid. Examples of suitable latent acids include hydroxylamine sulphate, hydroxylamine phosphate, hydroxylamine phenol sulphonate and hydroxylamine p-toluene sulphonate. Such latent acids are advantageous as they form a stable solid form and can be added to liquid and non-liquid pre-polymer resins.

In some embodiments, particularly where the pre-polymer is a solvented resole, a phenolic resole (PF) and/or UF, the polymer may be foamed by employing a foam blowing agent in the resin to form a 3-d porous structure or by using a carbonate ester as the low polarity organic solvent. Examples of suitable foam blowing agents include any low boiling solvent (ie boiling point 30-40° C. below the maximum reaction temperature of the mixture) which can form an emulsion in the resin with suitable surfactants. Examples of blowing agents in the suitable boiling range are cyclohexane (80.7° C.) and heptane (98.4° C.). Examples of suitable surfactants are dimethylsiloxane and polyoxyalkylenes. Examples of carbonate esters include cyclic carbonate esters such as propylene carbonate and ethylene carbonate. Such carbonate esters generate carbon dioxide on contact with the acid.

The following examples are not intended to limit the scope of the invention claimed. The phenolic resoles used in examples 1 to 14 are Resin 1 which is a solvented phenolic resole EPR 2007/049 (ex Dynea), wherein the solvent is a mixture of dibasic esters including dimethyl glutamate, dimethyl succinate and dimethyl adipate and the water content is less than 2% by weight, and Resin 2 which is an aqueous resole (grade 5398) containing 15% water and 5% ethylene glycol by weight. The graphite grade used is 2369 natural graphite ex Branwell Graphite. Hydroxylamine freebase 50% by weight aqueous solution, 65% by weight p-toluene sulphonic acid and 70% by weight methane sulphonic acid were all purchased from Sigma Aldrich. Hydroxylamine nitrate was obtained from Lansdowne. Ethanolamine (99%) and ammonium hydroxide (30%) were also purchased from Sigma Aldrich. Glass fibre, 6 mm, from Owens Corning. Glass mat was obtained from Technical Fibres, UK.

Examples 3-5, 9, 10, 18, 21, 24 and 27 are examples of retarded pre-polymer formulations.

Examples 1, 2, 7, 8, 16, 17, 19, 20, 22, 23, 25 and 26 show how the non retarded pre-polymer resin and acid catalyst combinations cannot be used in applications demonstrated in Examples 27-30 as there is no control of the reactivity.

Examples 27-30 show the retarded acid/resin formulations in composite applications including carbon composites, glass reinforced fibre composites and impregnated cloth. The retarded acid-curing pre-polymeric composition of the present invention is suitable for hand layup, continuous laminating, for preimpregnation, for resin transfer molding, for pultrusion, for filament winding and sheet molding compound. The equipment used for the manufacture of composites is well known to a person knowledgeable in this technology and comprises use of an impregnation tank containing the retarded acid-curing pre-polymeric composition of the invention. A reinforcing agent in the form of glass fibres, glass roving or glass fabric is immersed in the tank to impregnate the reinforcing agent with the retarded acid-curing pre-polymeric composition. In the case of glass fibres, the impregnated fibres are wound on a mandrel (filament winding) to produce the desired composite shape.

The pre-polymer resins used in examples 15 to 30 are: Resin 3 a phenol-formaldehyde/furfuryl alcohol blend (ex Dynea);

Resin 4 furfuryl alcohol (Aldrich);
Resin 5 a urea-formaldehyde resin; and
Resin 6 a melamine-formaldehyde resin.

Comparative Example 1, 7 and 8 and Examples 2-6, 9 and 10

In the following Examples, the effect of including hydroxylamine in the two-part resin mix was measured.

To establish the mole ratio of hydroxylamine to strong acid required to give a stable pre-mix containing phenolic resin and the level of catalyst required to cure the resin, hydroxylamine solution was added to Resin 1 in a glass vial with screw cap and mixed. To this p-toluene sulphonic acid solution was added slowly with further mixing and cooling to avoid heating the mixture. Each vial was held at room temperature and the vial periodically tilted to check if the mixture was liquid. The gel time was recorded when the mixture ceased to flow.

TABLE 2

|  | 1 (Comparative) | 2 | 3 | 4 | 5 |
|---|---|---|---|---|---|
| Resin 1 | 10 g | 10 g | 10 g | 10 g | 10 g |
| Hydroxylamine 50% by weight (HAM) | 0 g | 0.33 g | 0.51 g | 0.71 g | 0.93 g |
| Moles hydroxylamine | 0 | 0.0050 | 0.0077 | 0.0108 | 0.0141 |
| p-Toluene Sulphonic acid 65% by weight (pTSA) | 2.0 g | 2.0 g | 2.0 g | 2.0 g | 2.0 g |
| Moles p-TSA | 0.00755 | 0.00755 | 0.00755 | 0.00755 | 0.00755 |
| Molar Ratio HAM:pTSA | 0 | 0.662 | 1.0199 | 1.430 | 1.8675 |
| Gel time | 45 sec | 7 min | Did not gel | Did not gel | Did not gel |
| Description | Very exothermic Reaction | Mild exotherm | Very viscous after 160 days | Slightly viscous solution after 160 days | Thin solution after 160 days |

Table 2 shows the results of Comparative Example 1 and Examples 2-5 where the effect of increasing the mol ratio of hydroxylamine to p-toluene sulphonic acid on the reactivity and gel time of the resin mixture was determined. It has been found that a molar excess of hydroxylamine over a strong acid is necessary to prevent rapid catalysis and gelling at room temperature.

In Example 6, Example 4 from Table 2 was repeated and the vial was placed in an oven at 117° C. and allowed to stand for 10 minutes. On removal from the oven, the mixture was gelled and in a foamed form indicating rapid gellation on the decomposition of the hydroxylamine. A sample of Resin 1 on its own with no acid or hydroxylamine additive was placed in the oven at the same time with no change.

TABLE 3

|  | 7 (Comparative) | 8 (Comparative) | 9 | 10 |
|---|---|---|---|---|
| Resin 1 | 10 g | 10 g | 10 g | 10 g |
| Hydroxylamine 50% by weight (HAM) | 0 g | 0 g | 0.75 g | 0.96 g |

TABLE 3-continued

| | 7 (Comparative) | 8 (Comparative) | 9 | 10 |
|---|---|---|---|---|
| Moles hydroxylamine | 0 | 0 | 0.011 | 0.0145 |
| Methane Sulphonic acid 70% by weight (MSA) | 1.0 g | 2.0 g | 1.16 g | 1.16 g |
| Moles MSA | 0.00728 | 0.0146 | 0.0085 | 0.0085 |
| Molar Ratio HAM:MSA | 0 | 0 | 1.294 | 1.706 |
| Gel time | 2 min | 35 sec | Did not gel | Did not gel |
| Description | Very exothermic reaction | Very exothermic reaction | Thin solution after 122 days | Thin solution after 122 days |

Table 3 shows the results of Comparative Examples 7 and 8 and Examples 9 and 10. In these Examples, the effect of increasing the mol ratio of hydroxylamine to methane sulphonic acid on the reactivity and gel time of the resin mixture was investigated. It was again found that a molar excess of hydroxylamine over a strong acid is necessary to prevent catalysis and gelling at room temperature.

Examples 11 and 12

In Examples 11 and 12, the effect of including hydroxylamine in a two-part resin mix containing graphite was measured.

A storage stable pre-mix formulation (pTSA PM) using a hydroxylamine:p-toluene sulphonic acid mole ratio of 1.4:1 was prepared by charging 1588 g of Resin 1 to an 8 Liter Z-Blade mixer and mixing in 42.9 g of Hydroxylamine. To this was added 500 g graphite followed by 119 g of p-toluene sulphonic acid. The remainder of graphite 4150 g was then added gradually whilst continuing to mix. The mix was bagged and sealed.

A storage stable pre-mix formulation (MSA PM) using a hydroxylamine:methane sulphonic acid mole ratio of 1.45:1 was prepared by charging 1272 g of Resin 1 to an 8 Liter Z-Blade mixer and mixing in 44.3 g of hydroxylamine. To this was added 500 g graphite followed by 63.6 g of methane sulphonic acid. The remainder of graphite 3174 g was then added gradually whilst continuing to mix. The mix was bagged and sealed.

Both mixes were stored at room temperature and tested at intervals by removing a 10 g sample and placing in a 40×40×3 mm mould cavity in a Bipel press and compression moulding for three minutes under 25 tonnes pressure at 150° C. The pressed sample was then removed, weighed, measured and tested for through plane conductivity.

To measure through plane conductivity a Keithley Model 2400 SourceMeter capable of delivering 25 Amps and a Keithley 2700 data acquisition multiMeter capable of measuring 6 digits voltage drop were used to supply a constant current of 100 mA and to measure the voltage drop, respectively. In the test, the 40×40×3 mm sample is placed between two prepared gold electrodes. To improve electrical contact, the test sample was placed under a 10.4 KN load. The sample is then exposed to the test current and the voltage drop measured.

TABLE 4

| | p-TSA Pre-mix | | |
|---|---|---|---|
| Days Storage | Plate Weight (g) | Plate Thickness (mm) | Through plane Conductivity (S/cm) |
| 1 | 8.86 | 3.01 | 34.2 |
| 30 | 8.87 | 3.03 | 35.1 |
| 60 | 8.85 | 2.99 | 34.8 |

TABLE 5

| | MSA pre-mix | | |
|---|---|---|---|
| Days Storage | Plate Weight (g) | Plate Thickness (mm) | Through plane Conductivity (S/cm) |
| 1 | 9.12 | 3.08 | 31.4 |
| 30 | 9.08 | 3.06 | 31.6 |
| 60 | 9.09 | 3.06 | 32.0 |

Tables 4 and 5 show the storage stability of the plate formulations over time as evidenced by the consistency of plate thickness, plate weight and conductivity over time.

Comparative Example 13

The effect of mix life on plate dimensions and properties was illustrated using a non-retarded two part pre-mix formula.

The two part pre-mix formula consists of a resin and graphite mixture (RPM) and a strong acid catalyst and graphite mixture (CPM) which have the components as described in Table 6.

TABLE 6

| | RPM | CPM |
|---|---|---|
| Resin | 21 | 0 |
| p-Toluene Sulphonic acid | 0 | 21 |
| Graphite | 79 | 79 |
| Total | 100 | 100 |

In a Kenwood mixer 500 g of RPM and 100 g of CPM were mixed for 5 minutes. The mixer was then stopped and a 10.5 g sample removed and placed in a 40×40×3 mm mould cavity in a Bipel press and compression moulded for three minutes under 25 tonnes pressure at 80° C. The pressed sample was then removed, weighed, measured and tested for through plane conductivity. This was repeated periodically until 49 minutes had elapsed since the start of the mix. The effect of the increasing mix life on the weight, thickness and conductivity of the pressed samples are shown in Table 7. The through plane conductivity was measured as described in Examples 11 and 12 above.

TABLE 7

| Mix life before pressing (Minutes) | Plate Weight (g) | Plate Thickness (mm) | Through plane conductivity (Scm$^{-1}$) |
|---|---|---|---|
| 6.5 | 9.73 | 3.129 | 38.35 |
| 11.0 | 9.76 | 3.137 | 33.06 |
| 15.67 | 9.84 | 3.156 | 38.68 |
| 20.0 | 9.83 | 3.164 | 31.59 |
| 24.75 | 9.96 | 3.193 | 27.79 |

TABLE 7-continued

| Mix life before pressing (Minutes) | Plate Weight (g) | Plate Thickness (mm) | Through plane conductivity (Scm$^{-1}$) |
|---|---|---|---|
| 29.25 | 9.99 | 3.202 | 29.56 |
| 33.92 | 10.00 | 3.212 | 25.84 |
| 39.0 | 9.93 | 3.195 | 26.52 |
| 44.0 | 10.14 | 3.318 | 18.62 |
| 49.0 | 10.10 | 3.242 | 19.35 |

Table 7 shows the increase in weight and thickness of the pressed plates as the mix life increases. High dimensional tolerance is critical in the production of bipolar plates for fuel cells stacks as changes in plate thickness will distort the stack alignment on assembly. Table 7 also shows how the through plane conductivity, also a critical property of fuel cell plates, is more than halved over the mix life in this example. This mix life example gives a clear understanding of why a stable mix will enhance process control and quality control during the production of compression moulded parts.

Example 14

Retardation by hydroxylamine was compared with a primary amine and ammonium hydroxide.

In the following example, Resin 1 was mixed with retarded acid formulations: 1) hydroxylamine and methane sulphonic acid, 2) ethanolamine and methane sulphonic acid and 3) ammonium hydroxide and methane sulphonic acid. All retarded acid formulations were prepared by adding the acid slowly to the amine with cooling. The molar ratio of amine to acid was 1.5 for the three solutions.

The solutions were then blended with resin 1 at a ratio of 20% of the acid weight based on the resin weight. The three mixes (15 g) and a sample of resin 1 with no additive were placed in open glass vials which were then placed in an oven. The oven was progressively heated to 160° C. and the vials visually checked as the temperature increased. The temperature at which the resin mixtures gelled were noted and are compared in Table 8.

TABLE 8

| Temp ° C. | no additive | Hydroxylamine | Ethanolamine | Ammonium hydroxide |
|---|---|---|---|---|
| 110 | liquid | liquid | liquid | liquid |
| 120 | liquid | foaming | liquid | liquid |
| 130 | liquid | gel | liquid | liquid |
| 140 | liquid | | liquid | liquid |
| 150 | liquid | | liquid | liquid |
| 160 | gel | | foaming | liquid |
| 170 | | | gel | gel |

Table 8 shows the ethanolamine salt of methane sulphonic acid and the ammonium salt of methane sulphonic acid are both stable at temperatures higher than the temperature needed to cure resin 1 on its own.

A heat activated latent acid (or retarded acid formulation) is usually the salt product of an acid and a base. Ideally the salt will decompose at a temperature within a practical range to allow the subsequent acid catalysis to proceed. Ideally the base is strong enough to associate completely with an acid and maintain a pH at a high enough level to prevent premature acid catalysis. In addition the base should readily dissociate from the acid at an elevated temperature and be lost from the reaction mixture through evaporation or decomposition allowing the pH to drop and the acid catalysis to proceed. Furthermore, the decomposition temperature should not be so high that the pre-polymer is degraded.

Strong bases such as alkali metals and alkali earth metals are not suitable candidates for a latent acid salt. Strong bases form very stable salts with strong acids and will not decompose at low temperatures. A weaker base such as ammonia forms stable salts such as ammonium sulphate and ammonium chloride with sulphuric and hydrochloric acid respectively which will decompose, but at temperatures typically well above 200° C.

Primary and secondary amines, such as ethanolamine, propylamine, butylamine and diethylamine are weaker bases than ammonia and many will form salts with strong acids. The primary and secondary amine salt of strong acids will decompose at temperatures below 200° C. and the amines with a low enough boiling point will evaporate allowing the pH to drop and the acid catalysis to proceed. However, as shown in U.S. Pat. No. 5,344,909, the association between many primary and secondary amines and strong acids is not strong enough to prevent premature catalysis. Accordingly, it can be seen that hydroxylamine provides an ideal balance between storage stability and decomposition temperature.

Preparative Example 15

In this example, the retarded acid formulation was prepared.

A retarded acid formulation (I) of hydroxylamine and methane sulphonic acid was prepared by slowly adding the hydroxylamine solution (41.05 g 0.622 moles) dropwise into methane sulphonic acid (58.96 g, 0.429 moles) with stirring keeping the temperature of the mixture below 40° C.

A second retarded acid formulation (II) was prepared by the same method but using para-toluene sulphonic acid.

Comparative Examples

Examples 16-18

In the following comparative examples, all mixes were carried out in a fume hood.

In the following example PF/FA resin 3 was heated alone in example 16, mixed with methane sulphonic acid in example 17 and with retarded acid formulation (I) in example 18. The mixture in example 17 reacted strongly within seconds. The two other mixtures were added to glass vials and the vials heated in an oven with the temperature recorded at various stages during heating. The oven was progressively heated to 160° C. and the vials visually checked as the temperature increased. The temperatures at which the resin mixtures gelled were noted and are compared in Table 9.

TABLE 9

| Temp ° C. | Example 16 Resin 3 PF/FA | Example 17 Resin 3 PF/FA 10 g MSA 1 g | Example 18 Resin 3 PF/FA 10 g retarded acid formulation(I) 1.70 g |
|---|---|---|---|
| 25 | liquid | gelled immediately Strong exotherm | liquid |
| 50 | liquid | | liquid |
| 75 | liquid | | liquid |
| 100 | liquid | | liquid |
| 110 | liquid | | liquid |
| 120 | liquid | | foaming |
| 130 | liquid | | gel |
| 140 | liquid | | |

TABLE 9-continued

| Temp ° C. | Example 16 Resin 3 PF/FA | Example 17 Resin 3 PF/FA 10 g MSA 1 g | Example 18 Resin 3 PF/FA 10 g retarded acid formulation(I) 1.70 g |
|---|---|---|---|
| 150 | liquid | | |
| 160 | gel | | |

Table 9 shows the stabilising effect of the hydroxylamine in example 18 where the mixture remains liquid until the decomposition temperature of the retarded acid formulation (I).

Examples 19-21

In the following example the furfuryl alcohol (FA) resin 4 was heated alone in example 19, mixed with para-toluene sulphonic acid in example 20 and with retarded acid formulation (II) in example 21. The mixture in example 20 reacted violently immediately on mixing the acid with the furfuryl alcohol. The two remaining mixtures were added to glass vials and the vials heated in an oven with the temperature recorded at various stages during heating. The oven was progressively heated to 180° C. and the vials visually checked as the temperature increased. The temperatures at which the resin mixtures gelled were noted and are compared in Table 10.

TABLE 10

| Temp ° C. | Example 19 Resin 4 FA | Example 20 Resin 4 FA 10 g PTSA 1 g | Example 21 Resin 4/FA 10 g retarded acid formulation (II)1.70 g |
|---|---|---|---|
| 25 | liquid | gelled immediately violent exotherm | liquid |
| 50 | liquid | | liquid |
| 75 | liquid | | liquid |
| 100 | liquid | | liquid |
| 110 | liquid | | liquid |
| 120 | liquid | | gel |
| 130 | liquid | | |
| 140 | liquid | | |
| 150 | liquid | | |
| 160 | liquid | | |
| 170 | liquid | | |
| 180 | liquid | | |

Table 10 shows the stabilising effect of the hydroxylamine in example 21 where the mixture remains liquid until the decomposition temperature of the retarded acid formulation (II).

Examples 22-24

In the following example the Urea Formaldehyde (UF) resin 5 was heated alone in example 22, mixed with methane sulphonic acid in example 23 and with retarded acid formulation (I) in example 24. The mixtures were added to glass vials and the vials heated in an oven with the temperature recorded at various stages during heating. The oven was progressively heated to 180° C. and the vials visually checked as the temperature increased. The temperatures at which the resin mixtures gelled were noted and are compared in Table 11.

TABLE 11

| Temp ° C. | Example 22 Resin 5 UF | Example 23 Resin 5 UF 10 g MSA 1 g | Example 24 Resin 5 UF 10 g retarded acid formulation (I)1.70 g |
|---|---|---|---|
| 25 | liquid | gelled after 10 minutes | liquid |
| 50 | liquid | | liquid |
| 75 | liquid | | liquid |
| 100 | liquid | | hard gel in 10-20 seconds |
| 110 | liquid | | |
| 120 | foam | | |
| 130 | gel | | |

Table 11 shows the stabilising effect of the hydroxylamine in example 24 where the mixture remains liquid until the decomposition temperature of the retarded acid formulation (I). Although the gel temperature in example 23 is close to the gel temperature of the retarded acid formulation (I) mixture in example 24, the gel time was significantly longer up to 10 minutes compared to 10-20 seconds.

Examples 25-27

In the following example the Melamine Formaldehyde (MF) resin 6 was heated alone in example 25, mixed with methane sulphonic acid in example 26 and with retarded acid formulation (I) in example 27. The mixtures were added to glass vials and the vials heated in an oven with the temperature recorded at various stages during heating. The oven was progressively heated to 180° C. and the vials visually checked as the temperature increased. The temperatures at which the resin mixtures gelled were noted and are compared in Table 12.

TABLE 12

| Temp ° C. | Example 25 Resin 6 MF | Example 26 Resin 6 MF 10 g MSA 1 g | Example 27 Resin 6 MF 10 g retarded acid formulation (I)1.70 g |
|---|---|---|---|
| 25 | liquid | gelled after 8 minutes | liquid |
| 50 | liquid | | liquid |
| 75 | liquid | | liquid |
| 100 | liquid | | liquid |
| 110 | liquid | | liquid |
| 120 | liquid | | gel |
| 130 | liquid | | |
| 140 | liquid | | |
| 150 | liquid | | |
| 160 | liquid | | |
| 170 | gel | | |

Table 12 shows the stabilising effect of the hydroxylamine in example 27 where the mixture remains liquid until the decomposition temperature of the retarded acid formulation (I).

Application Examples 27-30

Application Example 27 concerns the preparation of a carbon composite plate.

A storage stable graphite/resin/latent acid pre-mix formulation was prepared by charging 1272 g of Resin 3(PF/FA) to an 8 Liter Z-Blade mixer and mixing in 210 g of retarded acid formulation (II). To this was added 500 g graphite. The remainder of graphite 3174 g was then added gradually whilst continuing to mix. The mix was bagged and sealed.

The mix was stored at room temperature and tested at intervals by removing a 10 g sample and placing in a 40×40×3 mm mould cavity in a Bipel press and compression moulding for three minutes under 25 tonnes pressure at 150° C. The pressed sample was then removed, weighed, measured and tested for through plane conductivity using the method described in examples 11 and 12.

TABLE 13

Graphite/Resin/retarded acid formulation (II) Pre-mix

| Days Storage | Plate Weight (g) | Plate Thickness (mm) | Through plane Conductivity (S/cm) |
|---|---|---|---|
| 1 | 9.12 | 3.04 | 21.4 |
| 30 | 9.10 | 3.03 | 21.8 |
| 60 | 9.12 | 3.04 | 22.4 |

Table 13 show the storage stability of the plate formulations over time as evidenced by the consistency of plate thickness, plate weight and conductivity.

Application Example 28 concerns the preparation of a bulk moulding compound (BMC).

A bulk moulding compound is a glass fibre filled polymer moulded by compression moulding at high pressure. In this example a bulk moulding compound was prepared by mixing 220 g of resin 2 (phenol-formaldehyde resole), 24 g retarded acid formulation (I), 150 g of 6 mm length glass fibre, 6 g of zinc stearate, 76 g calcium carbonate and 30 g of kaolin in a Kenwood. A shot size of 25 g was placed in a 60×60×3 mm mould and pressed under 25 tonne pressure for 3 minutes at 150° C.

TABLE 14

BMC mix

| Days Storage | Part Weight (g) | Part Thickness (mm) |
|---|---|---|
| 1 | 20.4 | 3.04 |
| 30 | 20.8 | 3.03 |
| 60 | 20.5 | 3.04 |

Table 14 shows the storage stability of the BMC formulations over time as evidenced by the consistency of plate thickness and plate weight.

Application Example 29 concerns the preparation of a polymer electrolyte.

Resin 1, the low water, solvented resole was mixed with retarded acid formulation mix (I) in a ratios of 1 part resin to 1.5 parts latent acid. The mixture was spread thinly onto a glass slide. The slide was placed in an oven and heat to 120° C. The mixture gelled to a thin film.

The resistivity of the film was measured using a multimeter and a reading of 23 kΩ recorded illustrating the electrolytic character of the material.

Application example 30 concerns the preparation of a pre-impregnated cotton mat for filament winding.

An impregnation bath was prepared by adding 100 g of phenol-formaldehyde resole (resin 2) and 10 g of retarded acid formulation (1) and mixing. A 20 cm strip of woven cotton was soaked in the bath and removed. The impregnated cotton strip was wound around a wooden mandrel and surplus liquid removed. The wound filament and mandrel was placed in an oven at 130° C. for 5 minutes. On removal from the oven the wound cotton filament was removed from the mandrel and found to be stiff and self supporting. The bath liquid was bottled and sealed The same impregnation and cure process was repeated 7 days later. This example illustrates the impregnation-shaping-cure process enabled by the retarded acid formulation. Also illustrated is the storage stability of the resin formulation and the advantage offered by using the impregnating mixture repeatedly instead of discarding and preparing a fresh mix.

Although the present invention has been described with reference to preferred embodiments, workers skilled in the art will recognize that changes may be made in form and detail without departing from the spirit and scope of the invention.

The invention claimed is:

1. A method of curing a retarded acid-curing pre-polymeric composition wherein the method comprises the steps of:
   initially providing an acid-curing pre-polymeric composition comprising an acid, a pre-polymer and hydroxylamine, wherein the reaction of the composition is retarded by the hydroxylamine and wherein the molar ratio of hydroxylamine to acid is at least 1:1;
   curing the composition by heating the composition.

2. The method according to claim 1 wherein the hydroxylamine is present in a molar ratio of hydroxylamine to acid which is selected from one of the following molar ratios: a molar ratio of hydroxylamine to acid of at least 1.3:1, a molar ratio of hydroxylamine to acid of at least 1.4:1, a molar ratio of hydroxylamine to acid of at least 1.7:1, a molar ration of hydroxylamine to acid of at least 1.9:1, a molar ratio of hydroxylamine to acid of at least 2.5:1, a molar ratio of hydroxylamine to acid of at least 3:1, a molar ratio of hydroxylamine to acid of at least 5:1.

3. A method of curing a retarded acid-curing pre-polymeric composition wherein the method comprises the steps of:
   initially providing an acid-curing pre-polymeric composition comprising an acid, a pre-polymer and hydroxylamine wherein the reaction of the composition is retarded by the hydroxylamine; and
   curing the composition by heating the composition.

4. The method according to claim 3 wherein the hydroxylamine is present in a molar ratio of hydroxylamine to acid which is selected from one of the following molar ratios: a molar ratio of hydroxylamine to acid of at least 1:1, a molar ratio of hydroxylamine to acid of at least 1.3:1, a molar ratio of hydroxylamine to acid of at least 1.4:1, a molar ratio of hydroxylamine to acid of at least 1.7:1, a molar ration of hydroxylamine to acid of at least 1.9:1, a molar ratio of hydroxylamine to acid of at least 2.5:1, a molar ratio of hydroxylamine to acid of at least 3:1, a molar ratio of hydroxylamine to acid of at least 5:1.

* * * * *